United States Patent Office.

REUBEN F. BROWN, OF PROVINCETOWN, MASSACHUSETTS.

Letters Patent No. 95,980, dated October 19, 1869.

IMPROVED COMPOSITION FOR BEVERAGE.

The Schedule referred to in these Letters Patent and making part of the same.

*To all persons to whom these presents may come:*

Be it known that I, REUBEN F. BROWN, of Provincetown, of the county of Barnstable, and State of Massachusetts, have invented a new and useful Composition for the Making of a Beverage with water; and I do hereby declare the same to be fully described in the following specification.

The ingredients of the composition, and their proportions, are:

Five pounds of pulverized sugar.
Two ounces of either tartaric or citric acid.
Four drachms of pulverized gum-arabic.
Twenty drops oil of lemon.
Forty drops of alcohol.

In compounding these ingredients, the oil of lemon and the alcohol may be mixed together; after which the mixture and the other ingredients should be thoroughly incorporated in a mortar or some other suitable vessel.

The whole will constitute a powder which may be employed to great advantage in preparing an agreeable and cooling beverage, as all that is necessary for the accomplishment of such, is to mix about two teaspoonfuls of the composition with a tumbler of water.

The alcohol, as well as the essential oil, will operate to prevent fermentation, and the essential oil will render the beverage more palatable to most person The gum-arabic, while serving to thicken the beverage, will promote its clarification, and render it more useful as a restorative in diseases of the throat and lungs.

I do not confine my invention to the precise proportions of the ingredients as hereinbefore given, as they may be varied somewhat without materially changing the composition.

The article, so made, may be put in packages, for sale and use, and will be found to be of great advantage to travellers, sportsmen, invalids, and others in hospitals, as it contains in a small space the essential principles of an agreeable and refreshing drink, water only being requisite to the completion of such. It can be transferred from place to place with little or no degree of injury from atmospheric or climatic influences.

I am aware that in making beverages, sugar, tartaric acid, citric acid, and essence of lemon, have been used; and therefore I make no claim to them in combination.

I employ with them gum-arabic, whereby the compound is greatly improved, and is rendered specially beneficial for invalids, especially those afflicted with bronchial inflammations, or irritations of the stomach and intestines, and the passages leading to the stomach.

I therefore claim the composition composed of gum-Arabic and other ingredients, as hereinbefore set forth.

REUBEN F. BROWN.

Witnesses:
J. H. BROWNE,
B. F. HUTCHINSON.